United States Patent [19]

Schlossman et al.

[11] Patent Number: 5,734,705
[45] Date of Patent: Mar. 31, 1998

[54] INTELLIGENT CONFIGURATION SERVER FOR PBX

[75] Inventors: David Y. Schlossman, Burlingame; William H. Welling, Portola Valley, both of Calif.

[73] Assignee: Xiox Corporation, Burlingame, Calif.

[21] Appl. No.: 626,173

[22] Filed: Mar. 29, 1996

[51] Int. Cl.[6] ................................................ H04M 15/00
[52] U.S. Cl. ........................ 379/117; 379/111; 379/112; 379/113; 379/114; 379/133
[58] Field of Search ................... 379/111–113, 133–134, 379/136, 265–266, 117, 234, 243

[56] References Cited

U.S. PATENT DOCUMENTS

| | | | |
|---|---|---|---|
| 5,048,079 | 9/1991 | Harrington et al. | 379/112 |
| 5,159,698 | 10/1992 | Harrington et al. | 379/112 |
| 5,333,183 | 7/1994 | Herbert | 379/112 |
| 5,627,886 | 5/1997 | Bowman | 379/111 |

*Primary Examiner*—Curtis Kuntz
*Assistant Examiner*—Duc Nguyen
*Attorney, Agent, or Firm*—Elmer Galbi

[57] ABSTRACT

An intelligent configuration system automatically logs a sample of a PBX Call Detail Recording (CDR) message. The sample CDR messages are sent via modem from a local call accounting system connected to the PBX to a central configuration server. The configuration server analyzes the sample CDR messages to determine the PBX type. The appropriate PBX interface file for the identified PBX type is transmitted back to the call accounting system and used by the accounting system to interpret and price CDR messages output from the PBX into call accounting and traffic analysis reports. Identification and location data is transmitted from the accounting system to the configuration server. The configuration server uses the data to automatically transmit and update rate tables used in the accounting system.

19 Claims, 3 Drawing Sheets

INTELLIGENT CONFIGURATION SERVER FOR PBX

BACKGROUND OF THE INVENTION

This invention relates generally to a Private Branch Exchange (PBX) and more particularly to an intelligent configuration server that automatically initializes a call accounting system which generates reports from PBX call detail record output data.

Phone calls from a PBX system are tracked and reported using call accounting programs. The accounting program reads Call Detail Recording (CDR) messages alternatively referred to as Station Message Detail Recording (SMDR) messages which are output from the PBX. A PBX output port, usually comprising an RS-232 receptacle, outputs the CDR messages. The accounting program is loaded onto a personal computer (PC) and the PC is connected directly into the RS-232 receptacle on the PBX or through an inline intermediate storage device, or via a dial-up modem.

The CDR messages output from the PBX output port contain information about each telephone call processed by the PBX. The call accounting program reformats the CDR messages into sophisticated tracking reports. For example, the accounting program can reformat the CDR messages into lists identifying telephone calls according to business department, telephone extension or by time of day. Different PBX manufacturers and even different PBX models from the same manufacturer may generate different CDR message formats. Therefore, in order to accurately decipher CDR messages, accounting programs must be configured specifically for the PBX type.

A rate table is a database that contains the cost of calls, for example, referenced to different parameters such as country codes, city codes, area codes and exchange based on the number dialed plus certain time-of-day considerations. Typically, rate tables are manually loaded into the PC running the accounting program via floppy disk. The rate tables are periodically updated, again via floppy disk, to reflect changes in phone tariffs.

Typically, call accounting programs require a local PBX technician to identify the PBX manufacturer and PBX model number as part of the sales order or part of the installation procedure. The call accounting program is either hard-coded to support the specific PBX type or shipped with pre-configured tables that support known PBX types. If the PBX type and model number are unknown to the local PBX technician or if the PBX type is not one of the PBX types hard-coded into the call accounting software, the accounting program cannot generate reports from the PBX.

Rate tables are typically manually loaded into the PC running the accounting program. Rate tables vary according to location of the PBX (area code and exchange) or vary according to country codes and city codes. Therefore, a different rate table is required for each accounting program or for each site configuration within the program which is operating in a different Local Exchange Carrier's rate center. There are over 15,000 rate centers in the U.S. Presently, the different rate tables are copied onto floppy disks and sent to each local PC software operator. The software operator then manually copies the contents of the floppy disk into the PC running the accounting program. Tariffs and numbering plans for telephone calls frequently change. Thus, rate tables must be constantly updated in each PBX accounting program. Manually tracking the appropriate rate table for each accounting program and then periodically mailing updated rate tables to each customer is time-consuming, expensive and prone to mishandling resulting in magnetic media damage.

Accordingly, a need remains for automatically reconfiguring an accounting program to run with different PBX types and CDR software package updates on a PBX, automatically updating program rate tables for each accounting program and increasing security for proprietary software used in the accounting program.

SUMMARY OF THE INVENTION

An intelligent configuration server analyzes sample CDR messages from different PBXs. A sample CDR message from a PBX is transmitted to the central configuration server via a standard dial-up modem. The configuration server determines the actual PBX type by comparing the sample CDR message with known CDR message streams previously stored in server memory.

If the PBX type is identified, a corresponding PBX interface file is transmitted from the configuration server back to a local PC connected to the PBX. The PBX interface file is used by the PC accounting program to identify the correct format for CDR messages output from the PBX. The accounting program can then correctly interpret the CDR messages output from the PBX into call reports. If a sample set of CDR messages is not recognized by the configuration server, a message is transmitted to the local PC software operator and to a customer service operator maintaining the configuration server.

The configuration server downloads rate tables via modem to the local PBX. The PC call accounting software automatically sends identification (ID) and location data to the configuration server. The ID and location data includes the name, address, area code and exchange for the local PBX. The configuration server uses the ID and location data to identify the appropriate rate table for the local PBX. The rate table is then automatically downloaded from the configuration server to the local PC for use with the accounting program.

Each remote PC software operator can manually request rate table updates at any time from the configuration server or schedule the downloads to take place automatically on a periodic basis. Thus, operator interaction is not required to maintain up-to-date tariffs in customers' call accounting programs.

CDR message analysis and rate table assembly is performed at one central configuration server location. Security of proprietary CDR message analysis software is increased since analysis software is not distributed to end users. The time and cost of distributing, tracking and updating rate tables for each customer is decreased since rate tables are automatically sent via modem from a central server.

Repeated end-user training due to personnel changes is reduced and system accuracy improved through the automation of this process.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
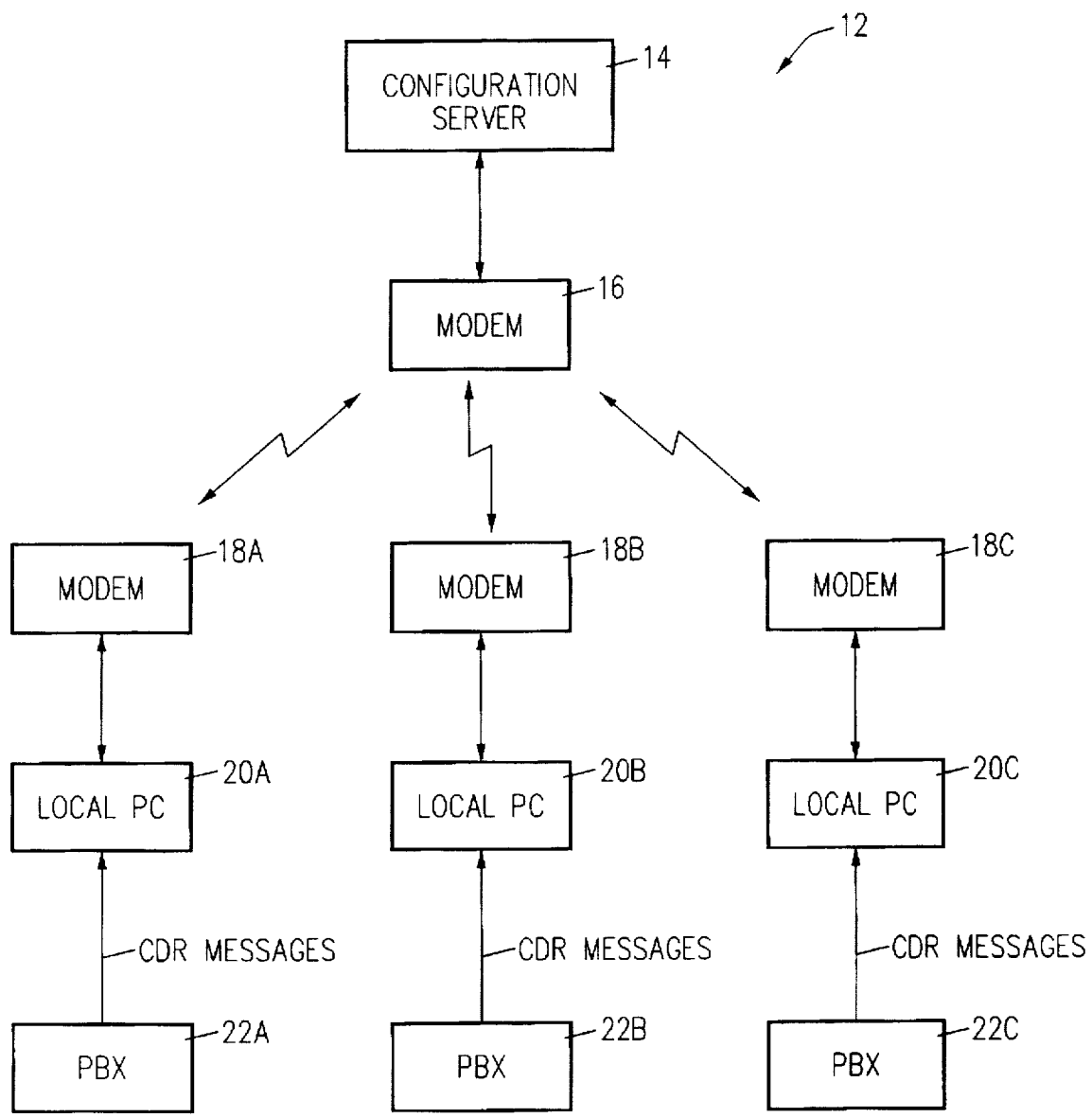
FIG. 1 is a diagram of an intelligent configuration system according to the invention.

FIG. 1 is a schematic diagram of an intelligent configuration system 12 according to the invention. A configuration server 14 is located at a central system support location and is coupled to a modem 16. One example of a configuration server 14 is a PC workstation attached to a Novell Netware 3.12 version server. However, any computer capable of receiving, sending and processing data in a manner described below can be utilized. For example, in another embodiment of the invention, a stand-alone call accounting system is used independently of the PC environment and comprises special hardware including a processor and memory for storing call records and rate tables, etc.

PBXs 22A, 22B and 22C each support a separate telephone network at different locations and are any of a large number of commercially available PBX systems well-known to those skilled in the industry. Each PBX 22A–22C is coupled to a local personal computer (PC) 20A–20C, respectively. Modems 18A–18C are connected to each local PC 20A–20C, respectively, and provide electronic data communication between the local PCs 20A–20C and configuration server 14 via modem 16.

The transmission of rate tables and configuration data between the configuration server and the host PC can be conducted by means other than an analog modem. In one embodiment, data is transmitted over a digital network, such as ISDN through a terminal adapter.

Figure 2:
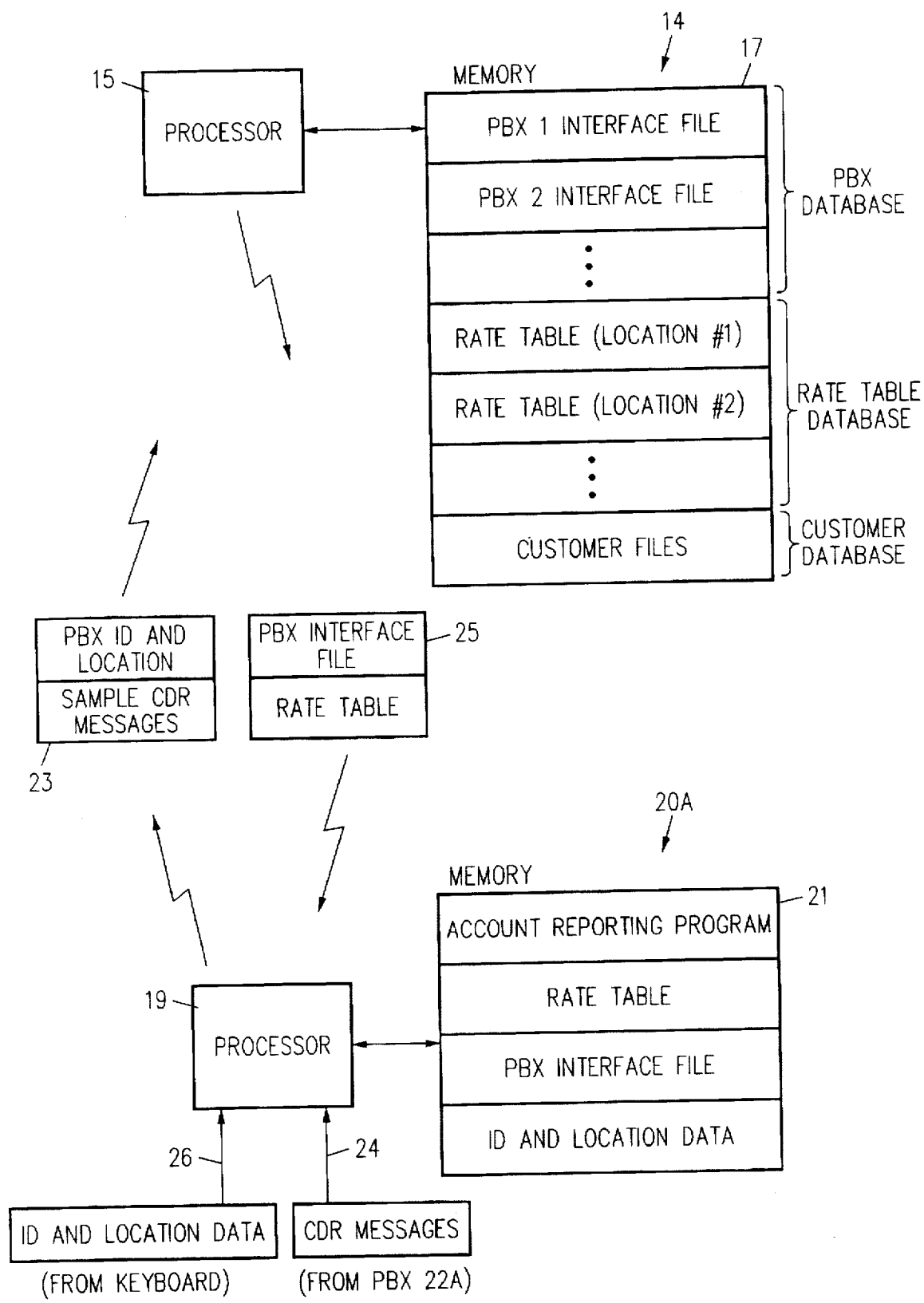
FIG. 2 is a detailed diagram of the intelligent configuration system shown in FIG. 1.

FIG. 2 is a detailed diagram of both the configuration server 14 and one of the local PCs 20A shown in FIG. 1. Local PCs 20B and 20C operate in a similar manner to PC 20A described below. The configuration server 14 includes a processor 15 connected to a memory 17. Memory 17 contains three databases. A PBX database includes PBX interface files containing information on different PBX types supported by the intelligent configuration system 12. For example, the PBX interface files may describe distinguishing characteristics of CDR message strings output by particular PBX types and identifies the appropriate translation routine used by the accounting program to interpret and price the CDR messages.

A rate table database contains rate tables for different telephone parameters such as area codes and exchanges or country codes and city codes instead of area codes and exchanges and multiple service providers. The rate tables contain tariff information for local and long distance telephone calls made through different telephone companies according to the day of the week and the time of the day. A customer database contains customer files for each accounting program supported by the intelligent configuration system 12.

Local PC 20A includes a processor 19 coupled to a memory 21. The memory 21 stores the accounting program, a rate table corresponding with the local PBX area code, a PBX interface file and ID and location data. The accounting program is used by processor 19 to generate telephone accounting reports and the rate table is used by the accounting program for cost analysis and traffic engineering analysis. The PBX interface file is used by the accounting program to identify the CDR message format output from the PBX. The ID and location data are transmitted to the configuration server 14 for referencing the appropriate customer file in memory 17.

The processor 19 receives ID and location data through a keyboard input 26 or automatically from the installation floppy diskette, and CDR messages from PBX 22A through an RS-232 input 24. The processor 19 transmits via modem 18A (FIG. 1) the PBX ID and location data and sample CDR messages 23 to processor 15. Processor 15 uses the CDR and location data 23 to identify the correct PBX interface file and rate table 25 for transmitting back to processor 18.

Figure 3:
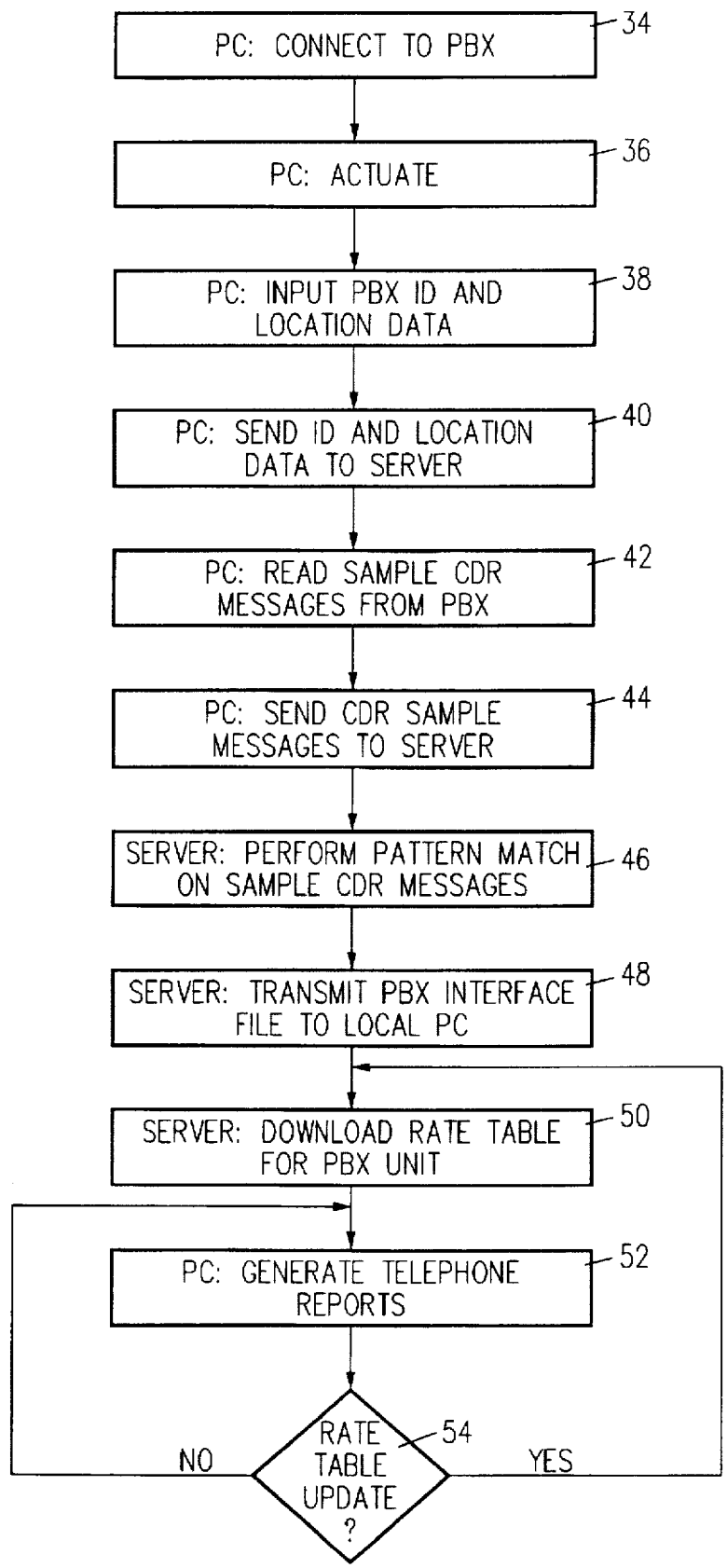
FIG. 3 is a step diagram showing a method for installing and operating the intelligent configuration system shown in FIG. 1.

Referring to FIG. 3, the intelligent configuration system 12 operates in the following manner. For simplicity, operation is referenced only to local PC 20A. Local PCs 20B and 20C operate in a similar manner. Local PC 20A is connected through RS-232 port 24 (FIG. 2) to the PBX 22A in step 34 and local PC 20A actuated in step 36. A PBX operator in step 38 inputs ID and location data via the keyboard input 26 (FIG. 2) into local PC 20A. Step 40 sends the ID and location data to the configuration server 14 via modems 18A and 16 (FIG. 1).

In step 42, the local PC 20A reads a set of sample CDR messages from the PBX 22A and step 44 transfers the sample CDR messages to configuration server 14. Step 46 analyzes the sample CDR messages in the configuration server 14 to determine the PBX type. The configuration server 14 matches the sample CDR messages sent from local PC 20A by identifying unique message characteristics described in a PBX description file stored in memory 17 (FIG. 2) for known PBX types.

The example below shows sample SMDR records output from different PBX units.

EXAMPLE #1

Sample SMDR Records:

| | | | | | | |
|---|---|---|---|---|---|---|
| 08/03 | 07:59 | 0000:01:34 | 2630 | | 121233380402542630 | X143 |
| 08/03 | 07:59 | 0000:02:02 | 2502 | | 161096233332542502 | X142 |
| 08/03 | 08:01 | 0000:00:14 | X124 | 004 | 4506 1111 | 3101 |
| 08/03 | 08:01 | 0000:00:30 | 4801 | | 52010732544801 | X146 |
| 08/03 | 08:02 | 0000:00:18 | 4352 | | 140439756432544352 | X147 |
| 08/03 | 08:03 | 0000:00:14 | X122 | 004 | 4506 1111 | 2208 |
| 08/03 | 08:02 | 0000:02:52 | X123 | 004 | 1111 | 3102 |
| 08/03 | 08:02 | 0000:02:20 | X124 | 004 | 1111 | 3103 |
| 08/03 | 08:05 | 0000:00:10 | 2630 | | 130554669082542630 | X148 |
| 08/03 | 08:05 | 0000:00:21 | X124 | 004 | 1111 | 2101 |
| 08/03 | 08:05 | 0000:00:07 | X147 | *** | 9 | T |
| 08/03 | 08:05 | 0000:00:14 | X124 | 005 | 4506 1111 | 2103 |
| 08/03 | 08:06 | 0000:00:11 | 4352 | | 18006944997 | T4 |
| 08/03 | 08:05 | 0000:01:08 | 4722 | | 18008762722 | T3 |
| 08/03 | 08:05 | 0000:01:12 | X148 | 004 | 1111 | 2104 |
| 08/03 | 08:06 | 0000:00:30 | X124 | 005 | 1111 | 3102 |
| 08/03 | 08:04 | 0000:02:44 | X209 | 001 | 2937 | 2937 |

-continued

| 08/03 | 08:04 | 0000:02:51 | 4353 |     | 2732937 |   | T1   |
|-------|-------|------------|------|-----|---------|---|------|
| 08/03 | 08:07 | 0000:00:05 | X205 | 023 | 2958    | T | 3364 |

PBX Analysis Match:

| Switch Type | mitel |
| Description | MITEL SX100/SX200 - MITL9105/9110-097-451NA-AUG81 |
| Call Type | Outgoing |
| Record Type | TIXIA 62..62 |
| Date | mm/dd 2..6 |
| Time | hh:mm 8..12 |
| Duration | hh:mm:ss 15..22 |
| Switch Type | mitel |
| Description | MITEL SX100/SX200 - MITL9105/9110-097-451NA-AUG81 |
| Call Type | Incoming |
| Record Type | TIXIA 24..24 |
| Date | mm/dd 2..6 |
| Time | hh:mm 8..12 |
| Duration | hh:mm:ss 15..22 |

EXAMPLE #2

Sample SMDR Records:

| N | 059 | 00 | T004001 0000 | DN7309 0000 |            | 09/15 | 08:20 | 00:05:48 |   |                |
|---|-----|----|--------------|-------------|------------|-------|-------|----------|---|----------------|
| D | 060 | 00 | T004001      | DN7309      |            | 09/15 | 08:26 | 00:05:48 |   |                |
| S | 061 | 00 | T004001 0000 | DN8091 0000 |            | 09/15 | 08:26 | 00:00:06 |   |                |
| N | 062 | 00 | DN7200 0000  | T002008 0000| 016.0.00.10| 09/15 | 08:26 | 00:00:40 | A | 800215104166242|
| N | 063 | 00 | T004002 0000 | DN7133 0000 | 014.0.00.14| 09/15 | 08:27 | 00:00:02 |   |                |
| N | 064 | 00 | DN7394 0000  | T002007 0000|            | 09/15 | 08:26 | 00:00:54 | A | 80214042307088 |
| N | 065 | 00 | DN7262 0000  | T002009 0000| 023.0.00.02| 09/15 | 08:26 | 00:03:02 | A | 800212092231660|

PBX Analysis Match:

| Switch Type | nt_tenan |
| Description | NT MERIDIAN 1 — MULTI-TENANT CODE |
| Call Type | Incoming |
| Record Type | (N!S!E)&T 1..1&10..10 |
| Date | mm/dd 38..42 |
| Time | hh:mm 44..48 |
| Duration | hh:mm:ss 50..57 |
| Switch Type | nt_tenan |
| Description | NT MERIDIAN 1 — MULTI-TENANT CODE |
| Call Type | Outgoing |
| Record Type | (N!S!E)&T 1..1&18..18 |
| Date | mm/dd 38..42 |
| Time | hh:mm 44..48 |
| Duration | hh:mm:ss 50..57 |
| Digits | (A y*) 59..80 |
| Switch Type | nt_tenan |
| Description | NT MERIDIAN 1 — MULTI-TENANT CODE |
| Call Type | TENANT |
| Record Type | 00&00 10.11&18..19 |

EXAMPLE #3

Sample SMDR Records:

| 0952 | 0001 | 7 | 9 | 83 | 886819        | 722 | 6 | 0 |    | 15 |
| 0952 | 0002 | 7 | 9 | 83 | 18002359216   | 702 | 7 | 0 |    | 03 |
| 0952 | 0017 | 0 |   |    | 785           | 301 |   |   |    |    |
| 0952 | 0021 | 9 |   |    | 799           | 83  | 7 | 0 | 02 |    |
| 0952 | 0045 | 7 | 9 | 83 | 7543788       | 706 | 6 | 0 |    | 08 |
| 0953 | 0004 | 7 | 9 | 80 | 0118525294118#| 371 | 7 | 0 |    | 14 |
| 0953 | 0062 | 9 |   |    | 799           | 80  | 7 | 0 | 06 |    |
| 0953 | 0000 | 7 | 9 | 83 | 8886819       | 722 | 6 | 0 |    | 09 |
| 0954 | 0188 | 9 |   |    | 788           | 84  | 7 | 0 | 04 |    |
| 0954 | 0001 | 0 |   |    | 740           | 302 |   |   |    |    |

-continued

| 0954 | 0011 | 9 |   |    | 799           | 83  | 7 | 0 | 02 |    |
| 0954 | 0005 | 0 |   |    | 771           | 302 |   |   |    |    |
| 0954 | 0015 | 7 | 9 | 83 | 5965433       | 705 | 6 | 0 |    | 12 |
| 0954 | 0020 | 9 |   |    | 754           | 84  | 7 | 0 | 05 |    |
| 0955 | 0004 | 7 | 9 | 80 | 0118525294118#| 371 | 7 | 0 |    | 12 |
| 0955 | 0067 | 7 | 9 | 83 | 5719330       | 343 | 6 | 0 |    | 07 |
| 0956 | 0002 | 7 | 9 | 83 | 2778194       | 310 | 6 | 0 |    | 15 |
| 0956 | 0005 | 7 | 9 | 83 | 2700535       | 771 | 7 | 0 |    | 14 |
| 0956 | 0038 | 7 | 9 | 83 | 6680264       | 312 | 7 | 0 |    | 10 |
| 0956 | 0034 | 9 |   |    | 799           | 80  | 7 | 0 | 16 |    |
| 0956 | 0001 | 0 |   |    | 312           | 301 |   |   |    |    |
| 0957 | 0001 | 7 | 9 | 83 | 2767255       | 771 | 7 | 0 |    | 11 |
| 0957 | 0015 | 9 |   |    | 799           | 83  | 7 | 0 | 02 |    |

-continued

| | | | | | | | | | |
|---|---|---|---|---|---|---|---|---|---|
| 0957 | 0009 | 7 | 9 | 83 | 3588000799 | 792 | 7 | 0 | 13 |
| 0957 | 0007 | 7 | 9 | 83 | 411 | 788 | 6 | 0 | 12 |
| 0957 | 0004 | 7 | 9 | 80 | 0118525294118# | 371 | 7 | 0 | 10 |
| 0957 | 0003 | 9 | | | 794 | 84 | 7 | 0 | 07 |

PBX Analysis Match:

| | |
|---|---|
| Switch Type | att75v3 |
| Description | AT&T SYS 75 R1V3 |
| Call Type | Incoming |
| Record Type | 9 11..11 |
| Date | |
| Time | hhmm 1..4 |
| Duration | hmmt 6..9 |
| Extension | x+ 32..35 |
| Switch Type | att75v3 |
| Description | AT&T SYS 75 R1V3 |
| Call Type | Outgoing |
| Record Type | 171AIC 11.11 |
| Date | |
| Time | hhmm 1..4 |
| Duration | hmmt 6..9 |
| Extension | x+ 38..41 |
| Digits | y+ 21..35 |

The configuration server 14 recognizes PBX types by matching the characteristics, such as record format, (other options are possible for other PBXs) with previously stored samples. As shown in the examples above, each of the three PBX units outputs a different SMDR record format. The configuration server 14 can accordingly identify the SMDR report type according to the specific format characteristics.

Each sample contains a default of 4000 characters or approximately 45 call records, depending on the CDR record length. A predetermined number of matches to the same PBX type is required before a match is considered complete. Each CDR message in the sample uploaded to the configuration server is evaluated against all stored PBX types.

Step 48 downloads the appropriate PBX interface file for the identified PBX type to local PC 20A. Failure to recognize a PBX type results in the configuration server 14 sending a message to local PC 20A as well as to customer service personnel operating the configuration server 14. The pattern matching program used by the configuration server 14 can be modified by a technician to add or change PBX recognition criteria. The sample CDR messages received from local PC 20A are preserved in memory on the configuration server 14 as PC files identified by the customer ID.

Step 50 downloads a rate table from the configuration server 14 to local PC 20A. The configuration server 14 uses the ID and location data (e.g., area code) transmitted in step 40 to locate the appropriate rate table for PBX 22A. Step 52 uses the downloaded PBX interface file and the downloaded rate table to generate accounting reports from the CDR messages output from PBX 22A.

The PBX operator can manually request rate table updates at any time or schedule the downloads to take place on a periodic basis. Decision step 54 monitors either a manual keyboard request or a preprogrammed periodic request for updating the rate table. When a manual or an automatic update request is made by the local PC 20A, decision step 54 jumps to step 50. The configuration server 14 then searches the customer database for the name of the rate table file of the local PC requesting the update. The configuration server locates the appropriate rate table and then sends the rate table to local PC 20A. Subsequent telephone reports generated in step 52 use the updated rate table transmitted in step 50.

Each session between the local PC 20A to the configuration server 14 is initiated with a unique serial number. The configuration server 14 verifies the serial number and the command in the customer database. If the serial number is not in the database or has already been registered, communication between the local PC 20A and configuration server 14 is terminated. Thus, the configuration server 14, without operator intervention, constantly monitors which accounting programs are initialized and when each accounting program requests a rate table update.

It should be noted that other embodiments of the system also come within the scope of the invention. For example, the entire system including the local PC and the configuration server can be contained within a single stand-alone PC which stores sample SMDR reports, rate tables, etc., performs the functions of configuration server 14 and local PC 20.

Having described and illustrated the principles of the invention in a preferred embodiment thereof, it should be apparent that the invention can be modified in arrangement and detail without departing from such principles. We claim all modifications and variation coming within the spirit and scope of the following claims. For example, the invention could be used in an environment where one PC monitors the performance of many PBX's. In such a situation, the PC could have an internal buffer that stores CDX messages until retrieved by the PC.

We claim:

1. An automatic configuration system for a PBX reporting system, comprising:

a PBX having an output for generating CDR messages;

a local computer coupled to the PBX output for receiving the CDR messages output from the PBX; and a configuration server electronically communicating with the local computer for receiving the CDR messages, the configuration server identifying a PBX type according to the CDR messages and transmitting the identified PBX type back to the local computer.

2. A configuration system according to claim 1 including a local modem coupled to the local computer and a server modem coupled to the configuration server.

3. A configuration system according to claim 1 wherein the local computer comprises a personal computer for running a telephone accounting and traffic engineering program, the accounting program reformatting the CDR messages into accounting and traffic engineering analysis reports according to the PBX type transmitted from the configuration server.

4. A configuration system according to claim 1 wherein the local computer includes memory for storing a telephone rate table transmitted from the configuration server.

5. A configuration system according to claim 1 wherein the configuration server includes a processor and a memory, the processor comparing the CDR messages received from the local processor to sample CDR messages for different PBX types previously stored in the configuration server memory.

6. A configuration system according to claim 5 wherein the configuration server memory stores multiple rate tables each associated with a different telephone area code and exchange, one of said multiple rate tables transmitted to the local computer according a local telephone area code associated with the PBX.

7. A configuration system according to claim 1 wherein the local computer is coupled directly to an RS-232 port on the PBX, or to an RS-232 port on an intermediate storage device (call storage buffer), or to a modem used to dial up an intermediate call storage device (pollable call storage buffer).

8. An automatic configuration system for a PBX account reporting system, comprising:
   multiple PBXs each having an output for generating CDR messages;
   multiple local computers each coupled to an associated one of the PBXs for receiving and transmitting the CDR messages; and
   a configuration server receiving a sample CDR message from each one of the local computers, the configuration server identifying an associated PBX type for each of the PBXs according to the sample CDR messages and transmitting the associated PBX type back to the local computers.

9. A configuration system according to claim 8 including multiple local modems each coupled to one of the local computers and a server modem coupled to the configuration server for receiving the CDR messages transmitted from each of the multiple local modems.

10. A configuration system according to claim 9 wherein the configuration server comprises a server processor and a server memory, the server processor comparing the CDR messages transmitted from each one of the local computers with CDR messages for different PBX types stored in the server memory.

11. A configuration system according to claim 10 wherein the server memory further contains multiple rate tables each associated with a different telephone area code and exchange, each of the local computers receiving an associated one of said multiple rate tables matching a PBX area code and exchange associated with the local computers.

12. A configuration system according to claim 11 wherein each one of the local computers includes a local processor and a local memory for storing the associated one of said multiple rate tables, the local processor generating account reports and traffic analysis reports according to the associated one of the rate tables and the associated PBX type transmitted from the configuration server.

13. A configuration system according to claim 12 wherein the local PC includes a keyboard input or disk image read for receiving identification and location data transmitted to the configuration for identifying the rate tables.

14. A method for automatically configuring a call reporting system connected to a PBX, comprising:
   providing a configuration server for storing PBX type information;
   generating a sample CDR message from the PBX;
   reading the sample CDR message generated from the PBX with the reporting system;
   transmitting the sample CDR message from the reporting system to the configuration server;
   identifying the PBX type with the configuration server according to the sample CDR message;
   transmitting the identified PBX type from the configuration server to the reporting system; and
   generating telephone reports from CDR messages output from the PBX according to the PBX type sent from the configuration server.

15. A method according to claim 14 including the following steps:
   transmitting PBX identification and location data from the reporting system to the configuration server;
   identifying a rate table in the configuration server associated with the transmitted PBX identification and location data;
   transmitting the identified rate table to the reporting system; and
   generating call rates in the telephone reports according to the transmitted rate table.

16. A method according to claim 15 wherein the step of transmitting PBX identification and location data includes inputting a PBX operator name, address, area code and exchange into the reporting system.

17. A method according to claim 16 including the following steps:
   programming a periodic time period into the reporting system;
   automatically transmitting an update request to the configuration server each periodic time period; and
   automatically sending an updated rate table from the configuration server to the reporting system after each update request.

18. A method according to claim 14 wherein the step of identifying the PBX type comprises comparing the sample CDR message with descriptions of distinguishing characteristics of various CDR messages for different known PBX types in the configuration server.

19. A method according to claim 14 wherein the configuration server stores multiple PBX interface files each associated with a different PBX, multiple rate tables each associated with a different telephone area code and exchange and multiple customers files each associated with a different PBX.

* * * * *